2,948,729

PURIFICATION OF WEAKLY BASIC ALKALOIDS BY THE USE OF NAPHTHOATE SALTS

Ralph Salkin, New York, N.Y., assignor to S. B. Penick and Company, New York, N.Y., a corporation of Delaware No Drawing. Filed Jan. 17, 1958, Ser. No. 709,478

17 Claims. (Cl. 260—286)

This invention relates to an improved process for isolating, in pure form, the weakly basic alkaloids found in the various Rauwolfia plant species, and to the naphthoate salts of these alkaloids which are employed in the process.

The Rauwolfia alkaloids as they occur in nature may be divided into three groups (1) the weakly basic, i.e. those extractable from strong acid solution with chloroform, (2) the moderately basic, i.e. those extractable into chloroform at pH 8.0 and (3) the strongly basic, i.e. those extractable into chloroform at pH 11. In the first group with which the present invention is concerned, are the ester alkaloids reserpine, 11-desmethoxyreserpine, rescinnamine, raunescine, iso-raunescine, and the like. In the second group are the delta yohimbines, the yohimbines and the ajmaline alkaloids. In the third group are the quaternary bases serpentine, serpentinine and the like.

Methods for the fractionation of the Rauwolfia alkaloids into these three groups are described in the literature, e.g. Schlittler et al. U.S. 2,752,351, June 26, 1956, Crystalline Reserpine Salts and Compositions thereof; Smith and Salkin, S. B. Penick and Co., British Patent 759,314, Manufacture of Alkaloids; and Hochstein et al., JACS 77, 3551 (1955). The major interest in the Rauwolfia field has centered on the weakly basic ester alkaloids of the first group. It is with the purification of the respective alkaloids in this group that this invention is concerned.

The starting materials are alkaloid-containing crude extracts of Rauwolfia plants which may be obtained in various ways as, for example, by treating the crude plant material with a water-soluble organic solvent such as methanol or ethanol and concentrating the extract or evaporating it to dryness, and by stirring the drug with acid water and using the acidic solution or precipitating the alkaloids therefrom and using these or by wetting the crude drug with water or an alkalinizing agent such as sodium bicarbonate, sodium carbonate or sodium hydroxide, and then extracting it with a water-immiscible organic solvent such as benzene, chloroform, carbontetrachloride, dichlorethylene, trichloroethylene, and the like and employing the extracts; or by any other extraction method which yields the desired alkaloid-containing crude extracts of Rauwolfia plants.

The following method outlines one of the processes that may be employed for preparing the starting materials used in this invention:

Two kilograms of the milled root of R. serpentina were moistened with 1 liter of 10 percent sodium bicarbonate solution in water and allowed to swell for several hours. The liberated alkaloids were extracted by percolation with benzene until the extracts gave only a faint positive test with mercuric iodide test solution (Valser's reagent, U.S.P. XIV). The benzene extract was concentrated to 400 milliliters and 800 milliliters ether were added. The solution was extracted repeatedly with N/2 hydrochloric acid and the combined acid solutions were then washed with ether, charcoaled, filtered, and then extracted with chloroform several times. The combined chloroform solutions were concentrated to ¼ of their volume, washed thoroughly with 10 percent aqueous sodium carbonate solution and with water, dried over anhydrous sodium sulfate, filtered, and evaporated to dryness in vacuo. The product was 5.0 grams of a Rauwolfia extract consisting entirely of weakly-basic alkaloids.

The weakly basic alkaloidal fractions obtained from the various Rauwolfia species by known methods of extraction are resinous, highly-pigmented mixtures containing between 50–65 percent of trimethyoxybenzoic acid and/or trimethoxy cinnamic acid ester alkaloids. The composition of the ester alkaloids contained in the weakly basic alkaloidal fraction varies with the particular Rauwolfia species used. Thus, R. serpentina and R. vomitoria contain reserpine and rescinnamine, while R. canescens contains reserpine, 11-desmethoxyreserpine (also known as deserpidine, and canescine), raunescine and iso-raunescine, all of which are known for their tranquilizing and hypotensive activities.

Once the weakly basic alkaloidal fraction has been obtained, a major portion of the reserpine contained therein may be separated by a methanol slurry since reserpine is only slightly soluble in this solvent. The residues remaining after the reserpine has been separated still contain significant amounts of reserpine along with the other ester alkaloids present in the various Rauwolfia species. The ester alkaloid content of these residual fractions is on the order of 60 percent, but, because of the resinous nature of this material, a simple and efficient method for the separation of these desired alkaloids from associated non-ester alkaloids, pigments and ballast materials has heretofore been unknown.

It is therefore an object of my invention to provide a simple and efficient method for the separation of a major portion of all these ester alkaloids from the crude highly pigmented amorphous fractions.

I have discovered that the various ester alkaloids occurring in the aforementioned Rauwolfia plants form sparingly soluble crystalline naphthoate salts and as such may be conveniently and efficiently separated from concentrates containing them. More specifically the acids useful for my invention are selected from the class of naphthoic acids wherein the naphthalene nucleus may contain substituents of one or more carboxy, hydroxy or ether linkages. (The terms "naphthoate salts" and "naphthoic acid" as used in the specification and claims is intended to include unsubstituted naphthoic acids, substituted naphthoic acid and wherein the substituents are one or more carboxy, hydroxy or ether linkages.) Specific examples of some of the acids useful in my invention are alpha and beta-naphthoic acids, 1(OH) 2-naphthoic acid, naphthalene-1,8-dicarboxylic acid and betanaphthoxyacetic acid. While all of the aforementioned acids may be used, alpha-naphthoic acid is preferred.

I have further discovered that when treating the weakly basic ester alkaloid fractions obtained from the various Rauwolfia species with alpha-naphthoic acid, the alkaloids which separated assayed 100 percent ester alkaloid. The specificity made is possible to separate the ester alkaloids from other unwanted resins and thus made it possible to purify them. Furthermore the efficiency of the naphthoate separation method is evidenced by the reduction of the ester alkaloid content of the fraction from the aforementioned 60 percent to 14.5 percent.

For example, the residual weakly basic alkaloid fractions obtained from R. serpentina and R. vomitoria contain a high percentage of the trimethoxycinnamic acid ester alkaloid, rescinnamine. Kidd, Chem. and Ind. 1955, page 1481 and Klohs et al. JACS 77, 2241 (1955) were able to isolate it, however, only by chromatography.

The isolation of this alkaloid has been hampered by the fact that rescinnamine does not form any sparingly soluble salts when reacted with the common inorganic or organic acids. A direct method for the isolation of rescinnamine is now made possible by my unexpected finding that this alkaloid yielded a sparingly soluble crystalline salt with the naphthoic acids described above.

It was further found that rescinnamine could be isolated in this way directly from the methanolic filtrate after removal of the reserpine from the weakly basic Rauwolfia alkaloids in the conventional manner. With the rescinnamine so prepared from both *R. serpentina* and *R. vomitoria* small amounts of reserpine were carried with it. Pure rescinnamine was obtained by crystallization of the mixed bases first from benzol and then from ethanol.

Application of the naphthoate separation to the weakly basic alkaloids of *R. canescens* from which a portion of the reserpine has been previously removed was next attempted. This fraction contains additional reserpine, 11-desmethoxyreserpine, raunescine and iso-raunescine. The crystalline naphthoate, after decomposition to mixed bases, was fractionated by known methods to give yields of pure reserpine and pure 11-desmethoxyreserpine 50 percent in excess of that heretofore obtainable.

It was established that the naphthoic acid could be recovered in essentially quantitative yields from the methanolic filtrate of the crystalline naphthoate by extracting a chloroform solution of this concentrate with aqueous carbonate solution. The acid obtained by precipitation of this solution with concentrated hydrochloric acid is separated, washed and dried. The recovered amorphous acid can be recycled to the process without purification.

The above disclosures establish both the novelty and utility of the naphthoate separation for an improved manufacturing method for the valuable ester alkaloids of Rauwolfia species.

The following examples are illustrative of the process of my invention, but are not to be construed as limiting especially since any other Rauwolfia species can be utilized and since other naphthoic acids and naphthoic acids substituted by one or more carboxy, hydroxy or ether linkages may be substituted for the alpha-naphthoic acid shown.

EXAMPLE 1

*(a) Method for preparation of alpha-naphthoate salts of the individual ester alkaloids of Rauwolfia species*

One gram of the alkaloid was added to 10 milliliters of methanol containing 0.35 gram of alpha-naphthoic acid and the mixture refluxed until the base was completely dissolved. The filtered solution was allowed to cool slowly and then refrigerated overnight. The crystalline slurry of the naphthoate salt was filtered and dried at 50 degrees centigrade in vacuo. Essentially quantitative yields were obtained.

For determination of the physical properties aliquots were recrystallized from 5 parts of methanol and Abderhalden dried at 80 degrees centigrade in vacuo.

The properties of the alpha naphthoate salts of the major ester alkaloids of Rauwolfia species obtained as shown above are summarized in the following table:

*(b) Method for the regeneration of base from naphthoate salts*

One gram of the naphthoate salt was dissolved in 10 milliliters of chloroform and 5 milliliters of a 10 percent aqueous sodium carbonate solution added. After vigorous agitation the lower chloroform layer was separated and shaken with a fresh portion of carbonate solution. The separated chloroform solution was finally washed with water, dried over sodium sulfate and distilled to dryness. The amorphous alkaloid was crystallized from an appropriate solvent, such as methanol, methanol-water, ethanol or benzol.

EXAMPLE 2

*Rescinnamine beta-naphthoate*

The beta-naphthoate of rescinnamine was prepared in a manner similar to that described for the alpha-naphthoates of Example 1(a) except that beta-naphthoic acid was used. An essentially quantitative yield was obtained. A recrystallized aliquot dried for 2 hours at 80 degrees centigrade in vacuo melted at 155–160 degrees centigrade. It had an $(alpha)_D$ of −19.3 (1 percent $CHCl_3$) and an ethanol solution showed the following bands in the ultra violet: Maximum 230 mu (log $e$ 5.08); maximum 293 mu (log $e$ 4.42); maximum 302 mu (log $e$ 4.43); minimum 255 mu (log $e$ 4.03).

EXAMPLE 3

*Rescinnamine 1(OH) 2-naphthoate*

The 1(OH) 2-naphthoate of rescinnamine was prepared by refluxing 3 grams of rescinnamine with 1 gram of 1(OH) 2-naphthoic acid in 100 milliliters of methanol. After slow cooling the desired derivative crystallized. Filtration of the chilled solution gave the salt in 90 percent yield. A methanol recrystallized aliquot after drying in vacuo at 80 degrees centigrade melted at 163–166 degrees centigrade. It has an $(alpha)_D$ of −22.4 (1 percent $CHCl_3$) and its ultra violet spectrum in ethanol showed the following bands: Maximum 224–7 mu (log $e$ 4.88); maximum 253 mu (log $e$ 4.62); maximum 303–4 mu (log $e$ 4.47); minimum 250 mu (log $e$ 4.61); minimum 267–8 (log $e$ 4.08).

EXAMPLE 4

*Rescinnamine beta-naphthoxyacetate*

Rescinnamine beta-naphthoxyacetate was prepared by refluxing 1.5 grams of rescinnamine with 0.5 gram of beta-naphthoxyacetic acid in 20 milliliters of methanol. Filtration of the chilled crystalline slurry gave a 93 percent yield of the desired salt. An aliquot recrystallized from methanol and Abderhalden dried at 80 degrees centigrade for 2 hours melted at 135 degrees centigrade with effervescence. It had an $(alpha)_D$ (1 percent $CHCl_3$) of −86.8 and showed the following bands in the ultra violet spectrum: Maximum 228 mu (log $e$ 5.14); shoulder 273–4 mu (log $e$ 4.17); maximum 303 mu (log $e$ 4.41); minimum 255 mu (log $e$ 4.00).

| Alkaloid alpha-Naphthoate | Reserpine | | 11-Desmethoxy-reserpine | | Rescinnamine | | Raunescine | | Iso-raunescine | |
|---|---|---|---|---|---|---|---|---|---|---|
| Melting Point in degrees centigrade | Sinters 145–7 Melts 204–6 | | 217–219 | | 130–32 150–53 | | 144–7 decomp. | | 150 195–8 | |
| Specific Rotation $(alpha)_D$, 1 percent $CHCl_3$ | −90.2 | | −102.0 | | −61.0 | | −55.7 | | −51.4 | |
| | mu | Log $e$ | mu | Log $e$ | mu | Log $e$ | mu | Log $e$ | mu | Log $e$ |
| Ultra Violet Spectrum (EtOH) | Max. 221–2 Min. 248–9 Max. 270–1 Min. 287–8 Max. 294 | 5.00 4.01 4.29 4.21 4.22 | Max. 222 Min. 247–8 Max. 273–4 Shoulder 290 mu | 5.02 3.92 4.33 | Max. 224–5 Min. 255 Max. 300 | 5.04 3.96 4.49 | Max. 221 Min. 247 Max. 273 Shoulder 290 mu | 4.99 3.93 4.30 | Max. 221 Min. 247 Max. 272–3 Shoulder 290 mu | 4.98 3.90 4.30 |

EXAMPLE 5

Rescinnamine naphthalate

Two hundred fifty milligrams of rescinnamine was refluxed with 75 milligrams of naphthalene-1,8-dicarboxylic acid in 7.5 milliliters of methanol until the rescinnamine was completely dissolved. The filtered solution was refrigerated. The crystalline precipitate was filtered off and recrystallized from 5 cc. of methanol. The recrystallized salt was Abderhalden dried in high vacuum at room temperature for 6 hours. The dried solid sintered at 130 degrees centigrade and melted sharply at 207–209 degrees centigrade. The ultra-violet spectrum in ethanol showed the following bands:

Maximum 227 mu $E_1^1$ 1015; minimum 261 $E_1^1$ 375; maximum 302–3 mu $E_1^1$ 125

The specific rotation of a 1 percent solution in chloroform was —61.6.

EXAMPLE 6

Separation of rescinnamine and reserpine from weakly basic alkaloid fraction of R. vomitoria via the alpha-naphthoate The weakly basic alkaloid fraction from 10 kilograms of R. vomitoria was isolated as described in our British Patent No. 759,314. This amorphous fraction was refluxed with 125 milliliters of methanol and then refrigerated. The crude crystalline reserpine was filtered and washed with methanol. The methanol filtrate and washings, which contain rescinnamine and the remaining reserpine, was concentrated to 50 milliliters. Five grams of alpha-naphthoic acid was added and the mixture was refluxed for several minutes. It was then cooled to room temperature, seeded with rescinnamine alpha-naphthoate and refrigerated overnight. The crystalline precipitate was filtered, washed with cold methanol and dried at 50 degrees centigrade in vacuo, 3.56 grams of mixed naphthoates were obtained. The naphthoates were decomposed to base as described in Example 1(b). The amorphous bases were dissolved by warming in 15 milliliters of benzol, seeded with rescinnamine and refrigerated. Filtration yielded 1.9 grams of rescinnamine assaying 95 percent by ultra violet. Recrystallization of this base from 10 parts of ethanol yielded 1.6 grams of pure rescinnamine. Melting point 232–234 (open capillary); (alpha)$_D$ —95.5 (1 percent CHCl$_3$); the ultra violet spectrum showed the following bands: Maximum 229 mu (log e 4.75); maximum 302–3 mu (log e 4.43); minimum 257 mu (log e 3.88). A sample recrystallized for analysis gave the following values: Calculated for $C_{35}H_{42}O_9N_2$: C—66.23; H—6.67; N—4.41; OCH$_3$—29.34. Found: C—66.24; H—6.53; N—4.53; OCH$_3$—29.14.

The benzol and alcohol crystallization combined mother liquors were concentrated to dryness in vacuo and the residue dissolved in 10 milliliters of methanol. The solution was acidified with acetic acid and 250 milliliters of solid ammonium nitrate dissolved in the filtered mixture. The chilled solution was seeded with reserpine nitrate and refrigerated. Crystallization from methanol of the base obtained from the decomposed nitrate, yielded 350 milligrams of reserpine. Reworking the nitrate mother liquor yielded an additional 200 milligrams of rescinnamine.

EXAMPLE 7

(a) Preparation of reserpine and 11-desmethoxyreserpine from R. canescens via the alpha-naphthoate The weakly basic alkaloid fraction from 10 kilograms of R. canescens, obtained by the general method described in British Patent No. 759,314, was refluxed with 125 milliliters of methanol. The crude reserpine, which crystallized on cooling, was filtered and dried. It weighed 4.75 grams and contained about 15 percent raunormine by infra red analysis.

The methanolic filtrate was concentrated to 45 milliliters and 3.5 grams of alpha-naphthoic acid was added. After refluxing for several minutes on a steam bath the solution was cooled, seeded with 11-desmethoxyreserpine alpha-naphthoate and placed in a refrigerator overnight. Filtration of the crystalline slurry yielded 4.25 grams of dry mixed naphthoates. The naphthoate was decomposed to base as described in Example 1(b). The reserpine in these mixed bases was separated from the 11-desmethoxyreserpine via the hydrochloride.

The crude reserpine obtained from the initial methanol digest was also purified over the hydrochloride, and the combined reserpine hydrochlorides crystallized from methanol. The reserpine obtained from the decomposition of this salt was crystallized from chloroform-methanol. A finished yield of 3.05 grams of reserpine was obtained. Melting point 258–262; (alpha)$_D$ —109 (2 N HAc); ultra violet purity 98 percent.

The bases recovered from the combined hydrochloride mother liquors were crystallized from 3 volumes of ethyl acetate. The crude 11-desmethoxyreserpine was recrystallized from 5 parts of ethyl acetate and the recrystallized base dried at 110 degrees centigrade in vacuo. A finished yield of 1.21 grams of 11-desmethoxyreserpine was obtained. Melting point 224–227 degrees centigrade; (alpha)$_D$ —163 (1 percent Py), its reserpine content by differential infra red assay was 2.5 percent.

The alkaloids obtained from the naphthoate filtrate contained only 14.5 percent ester alkaloids.

(b) Preparation of raunescine and iso-raunescine

The ethylacetate mother liquor from Example 7(a) were evaporated to dryness in vacuo. The residue was then converted to the nitrate by dissolving it in alcohol and glacial acetic acid and adding ammonium nitrate. The nitrates were then filtered off and leached with hot alcohol. (These nitrates contain additional reserpine and 11-desmethoxyreserpine in relatively insignificant amounts.) The nitrate mother liquors were then concentrated, and the free bases prepared by taking the residue up in chloroform and decomposing it by washing the chloroform with potassium carbonate solution. The bases obtained after concentrating the chloroform were then converted to the alpha-naphthoates as in Example 1(a). The alpha-naphthoate thus obtained was recrystallized from methanol. The purified alpha-naphthoate was decomposed into the free base by dissolving it in chloroform, shaking its chloroform solution with potassium carbonate solution, separating the lower chloroform layer and concentrating this layer to dryness in vacuo. The residue was then taken up in an eight-fold amount of methanol, and the solution heated. Water was added to the hot solution until the methanol was of 90 percent concentration. The raunescine then crystallized out and was recrystallized from 90 percent methanol.

The methanol filtrates of raunescine contain the iso-raunescine which was then obtained by chromatography in the well-known manner.

EXAMPLE 8

Isolation of rescinnamine and reserpine from the weakly basic alkaloids of R. serpentina, via the alpha-naphthoate The weakly basic alkaloids from 5 kilograms of R. serpentina obtained as described in our British Patent No. 759,314, was refluxed with 50 milliliters of methanol and the slurry refrigerated. The crude crystalline reserpine was filtered, washed with cold methanol and dried. 4.3 grams assaying 93 percent by ultra violet was obtained.

The methanolic filtrate and washings were concentrated to 40 milliliters and 3 grams of alpha-naphthoic acid dissolved in the warm mixture. The solution was cooled, seeded with rescinnamine alpha-naphthoate and refrigerated. The heavy crystalline slurry was filtered and washed with cold methanol. The bases obtained by decomposing the mixed naphthoates as described in Example 1–b were crystallized from 20 milliliters of methanol. 1.2 grams of crude second crop reserpine was obtained. The combined crude reserpine crops were recrystallized from methanol to yield 4.35 grams of pure reserpine melting point 263–266 degrees centigrade; (alpha)$_D$ −108 (1 percent 2 N HAc).

The methanolic filtrate from the second crop reserpine was concentrated to dryness and thoroughly degassed in vacuo. The residue was crystallized from 4 parts of benzol. The crude rescinnamine was recrystallized from 10 parts of ethanol to give 1.1 grams of pure rescinnamine melting point 231–233 degrees centigrade (open capillary) (alpha)$_D$ −96.0 (1 percent CHCl$_3$).

Since it will be obvious to those skilled in the art that various modifications may be made in the processes and products of the present invention without departing from the spirit or scope thereof, it is to be understood that I limit myself only as defined in the appended claims.

I claim:

1. Sparingly soluble crystalline naphthoate salts of weakly basic Rauwolfia alkaloids selected from the group consisting of reserpine, raunormine, rescinnamine, raunescine and iso-raunescine, wherein said naphthoate salts are selected from the group consisting of alpha-naphthoate, beta-naphthoate, 1-hydroxy-2-naphthoate, naphthalene-1,8-dicarboxylate and beta-naphthoxyacetate.

2. Sparingly soluble crystalline alpha-naphthoic acid salts of weakly basic Rauwolfia alkaloids selected from the group consisting of reserpine, raunormine, rescinnamine, raunescine and iso-raunescine.

3. Reserpine alpha-naphthoate.
4. 11-desmethoxyreserpine alpha-naphthoate.
5. Rescinnamine alpha-naphthoate.
6. Raunescine alpha-naphthoate.
7. Isoraunescine alpha-naphthoate.
8. Rescinnamine beta-naphthoate.
9. Rescinnamine beta-naphthoxyacetate.

10. The process of separating pure rescinnamine from a weakly basic alcoholic alkaloidal fraction of a Rauwolfia species containing rescinnamine and other alkaloids which comprises: treating said alcoholic alkaloidal fraction with a naphthoic acid selected from the group consisting of alpha-naphthoic acid, beta-naphthoic acid, 1-hydroxy-2-naphthoic acid, naphthalene-1,8-dicarboxylic acid and beta-naphthoxyacetic acid; seeding the reaction mixture with previously prepared rescinnamine naphthoate, the naphthoate being that of the particular naphthoic acid used to treat the alcoholic alkaloidal fraction; refrigerating the seeded reaction mixture; separating the rescinnamine naphthoate which precipitates; and, regenerating the free base, rescinnamine, from said rescinnamine naphthoate.

11. The process of claim 10, in which the naphthoic acid used is alpha-naphthoic acid.

12. The process of claim 10, in which the naphthoic acid used is beta-naphthoic acid.

13. The process of claim 10, in which the naphthoic acid used is 1-hydroxy-2-naphthoic acid.

14. The process of claim 10, in which the naphthoic acid is naphthalene-1,8-dicarboxylic acid.

15. The process of claim 10, in which the naphthoic acid used is beta-naphthoxyacetic acid.

16. The process of separating pure rescinnamine from a weakly basic alcoholic alkaloidal fraction of a Rauwolfia species containing rescinnamine and other alkaloids which comprises: treating said alcoholic alkaloidal fraction with a naphthoic acid selected from the group consisting of alpha-naphthoic acid, beta-naphthoic acid, 1-hydroxy-2-naphthoic acid, naphthalene-1,8-dicarboxylic acid and beta-naphthoxyacetic acid; seeding the reaction mixture with previously prepared rescinnamine naphthoate, the naphthoate being that of the particular naphthoic acid used to treat the alchoholic alkaloidal fraction; refrigerating the seeded reaction mixture; separating the rescinnamine naphthoate which precipitates, dissolving the rescinnamine naphthoate in chloroform, adding aqueous sodium carbonate to the resultant solution, agitating said solution, separating off the lower chloroform layer, and distilling it to dryness, and recrystallizing the rescinnamine residue.

17. The process of preparing the naphthoate salt of a weakly basic Rauwolfia alkaloid selected from the group consisting of reserpine, raunormine, rescinnamine, raunescine, and iso-raunescine, wherein said naphthoate salt is selected from the group consisting of alpha-naphthoate, beta-naphthoate, 1-hydroxy-2-naphthoate, naphthalene-1,8-dicarboxylate and beta-naphthoxyacetate, which comprises: refluxing said weakly basic Rauwolfia alkaloid with a methanolic solution of a naphthoic acid selected from the group consisting of alpha-naphthoic acid, beta-naphthoic acid, 1-hydroxy-2-naphthoic acid, naphthalene-1,8-dicarboxylic acid and beta-naphthoxyacetic acid, cooling the reaction mixture, separating and drying the crystalline slurry of said naphthoate salt which precipitates.

References Cited in the file of this patent

UNITED STATES PATENTS 2,752,351 Schlittler _____ June 26, 1956

FOREIGN PATENTS 759,314 Great Britain _____ Oct. 17, 1956

OTHER REFERENCES

Hosansky et al.: Jour. of the Amer. Pharm. Assoc., vol. 44, #10, October 1955, pp. 639–644.